(12) United States Patent
Piechnick et al.

(10) Patent No.: US 12,420,410 B2
(45) Date of Patent: Sep. 23, 2025

(54) METHOD, SYSTEM AND NONVOLATILE STORAGE MEDIUM

(71) Applicant: Wandelbots GmbH, Dresden (DE)

(72) Inventors: Christian Piechnick, Dresden (DE); Klaus Wagner, Osann-Monzel (DE)

(73) Assignee: WANDELBOTS GMBH, Dresden (DE)

( * ) Notice: Subject to any disclaimer, the term of this patent is extended or adjusted under 35 U.S.C. 154(b) by 715 days.

(21) Appl. No.: 17/436,631

(22) PCT Filed: Mar. 6, 2020

(86) PCT No.: PCT/EP2020/056052
§ 371 (c)(1),
(2) Date: Sep. 6, 2021

(87) PCT Pub. No.: WO2020/178435
PCT Pub. Date: Sep. 10, 2020

(65) Prior Publication Data
US 2022/0143830 A1    May 12, 2022

(30) Foreign Application Priority Data
Mar. 7, 2019    (DE) .................... 10 2019 105 820.1

(51) Int. Cl.
*B25J 9/16*  (2006.01)
*G05B 19/42*  (2006.01)
*G05B 19/423*  (2006.01)

(52) U.S. Cl.
CPC .......... *B25J 9/1664* (2013.01); *B25J 9/1671* (2013.01); *G05B 19/423* (2013.01);
(Continued)

(58) Field of Classification Search
CPC ..... B25J 9/1664; B25J 9/1671; G05B 19/423; G05B 2219/36436; G05B 2219/36479;
(Continued)

(56) References Cited

U.S. PATENT DOCUMENTS 9,186,795 B1    11/2015  Edsinger et al.
9,731,419 B2 *   8/2017  Halsmer ................ B25J 9/1656
(Continued)

FOREIGN PATENT DOCUMENTS

CN        103921265 A       7/2014
CN        107738256 A       2/2018
(Continued)

OTHER PUBLICATIONS

"Third Party Observation for Application No. EP20200710474 directed to a YouTube video about a 6D Mimic Method", https://www.youtube.com/watch?v=mIU_n9VzO08, Jan. 13, 2023, 8 pages.

*Primary Examiner* — Kira Nguyen
(74) *Attorney, Agent, or Firm* — Synergy IP Group AG; Natalie A. Ablrecht

(57) ABSTRACT

Disclosed herein is a method, system, and non-volatile storage medium for simplifying the automation of a process of flow. The method may include determining a machine-independent process model based on data representing a handling of a work tool for performing a process flow. The process flow may include a plurality of sub-processes and the process model may link a process activity with spatial information for each sub-process. The method may also include mapping the machine-independent process model to a machine-specific control model of a machine using a model of the machine. The machine-specific control model may define an operating point of the machine for each sub-process, and the operating point may correspond to the process activity and to the spatial information.

20 Claims, 7 Drawing Sheets

(52) U.S. Cl.
CPC .............. *G05B 2219/36436* (2013.01); *G05B 2219/36479* (2013.01); *G05B 2219/40116* (2013.01); *G05B 2219/40391* (2013.01)

(58) Field of Classification Search
CPC ........... G05B 2219/40116; G05B 2219/40391; G05B 19/427
See application file for complete search history.

(56) References Cited

U.S. PATENT DOCUMENTS

| | | | |
|---|---|---|---|
| 10,166,673 B2* | 1/2019 | Orman | G06F 3/016 |
| 10,430,726 B2 | 10/2019 | Sugiyama | |
| 10,520,912 B2 | 12/2019 | Wang | |
| 10,870,168 B2 | 12/2020 | Aoki et al. | |
| 10,960,543 B2 | 3/2021 | Aldridge et al. | |
| 11,474,510 B2 | 10/2022 | Oestergaard | |
| 2008/0162004 A1* | 7/2008 | Price | G05D 1/0274 |
| | | | 701/50 |
| 2009/0132088 A1 | 5/2009 | Taitler | |
| 2012/0066662 A1* | 3/2012 | Chao | G06Q 10/06 |
| | | | 717/104 |
| 2014/0201112 A1 | 7/2014 | Sawada | |
| 2015/0024345 A1* | 1/2015 | Eftekhar Ashtiani | A61C 13/0022 |
| | | | 428/542.8 |
| 2018/0029226 A1 | 2/2018 | Dani et al. | |
| 2018/0349527 A1* | 12/2018 | Li | G06N 3/08 |
| 2019/0009360 A1 | 1/2019 | Toshimichi et al. | |
| 2020/0206920 A1* | 7/2020 | Ma | G06Q 10/0633 |
| 2020/0387150 A1 | 12/2020 | Aldridge et al. | |
| 2022/0063098 A1 | 3/2022 | Aldridge et al. | |

FOREIGN PATENT DOCUMENTS

| | | |
|---|---|---|
| CN | 108161904 A | 6/2018 |
| CN | 108214485 A | 6/2018 |
| CN | 108284434 A | 7/2018 |
| CN | 108883534 A | 11/2023 |
| DE | 102005060967 A1 | 9/2011 |
| EP | 1435280 | 7/2004 |
| EP | 1842631 A1 | 10/2007 |
| JP | H09216183 A | 8/1997 |
| JP | 2004209641 A | 7/2004 |
| JP | 2015111338 A | 6/2015 |
| JP | 2019013937 A | 1/2019 |
| WO | 2013033747 A1 | 3/2013 |

* cited by examiner

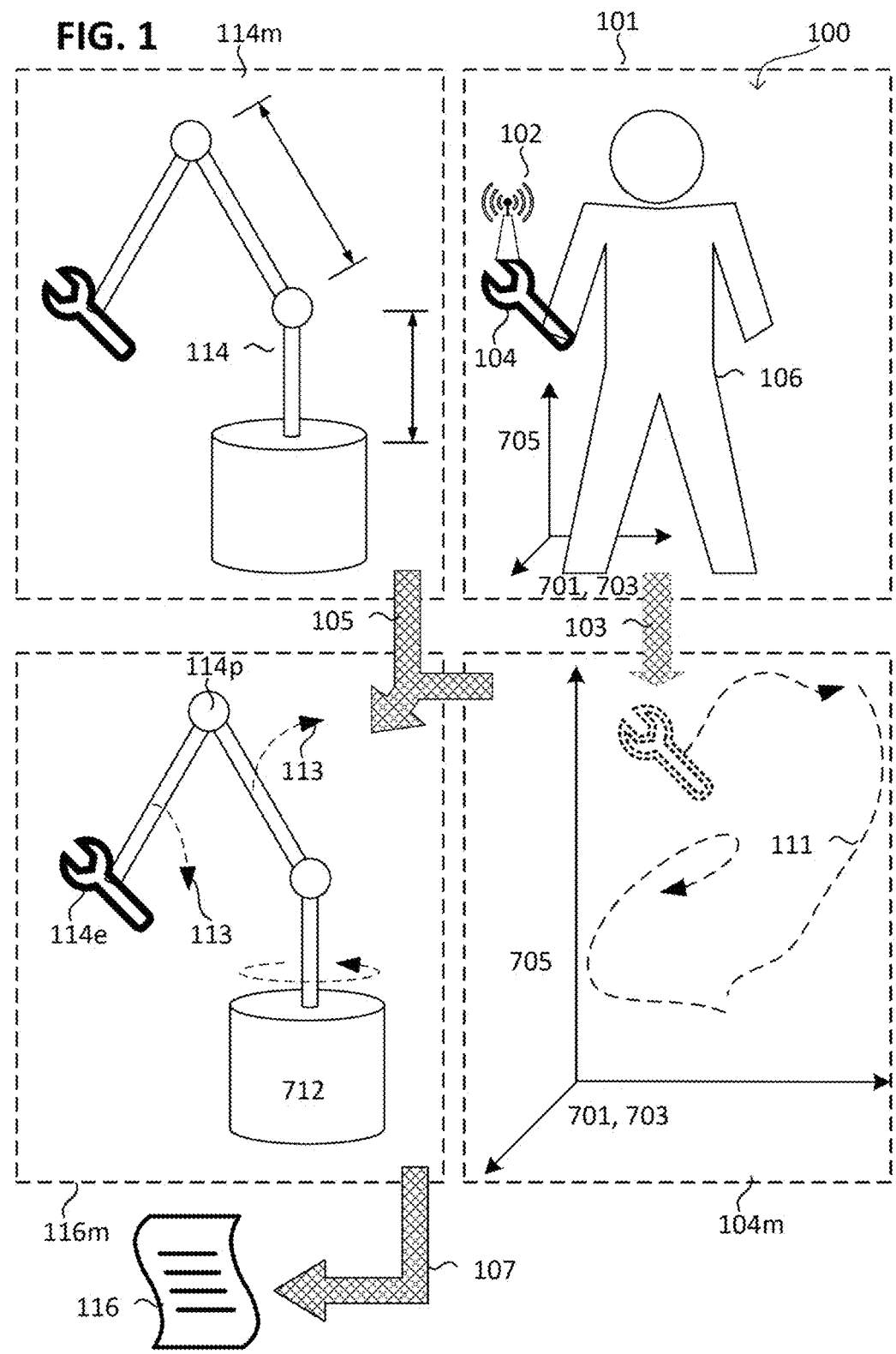

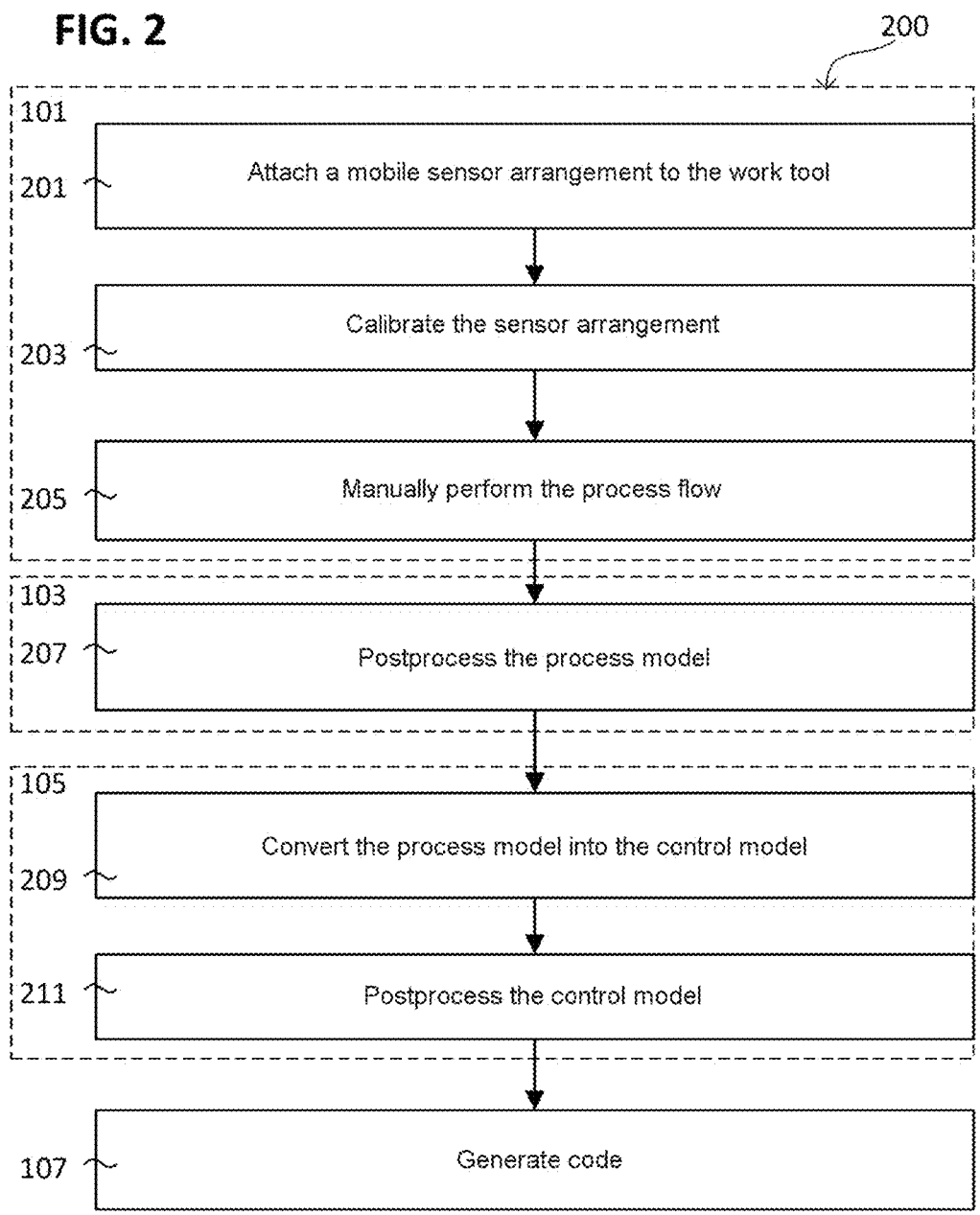

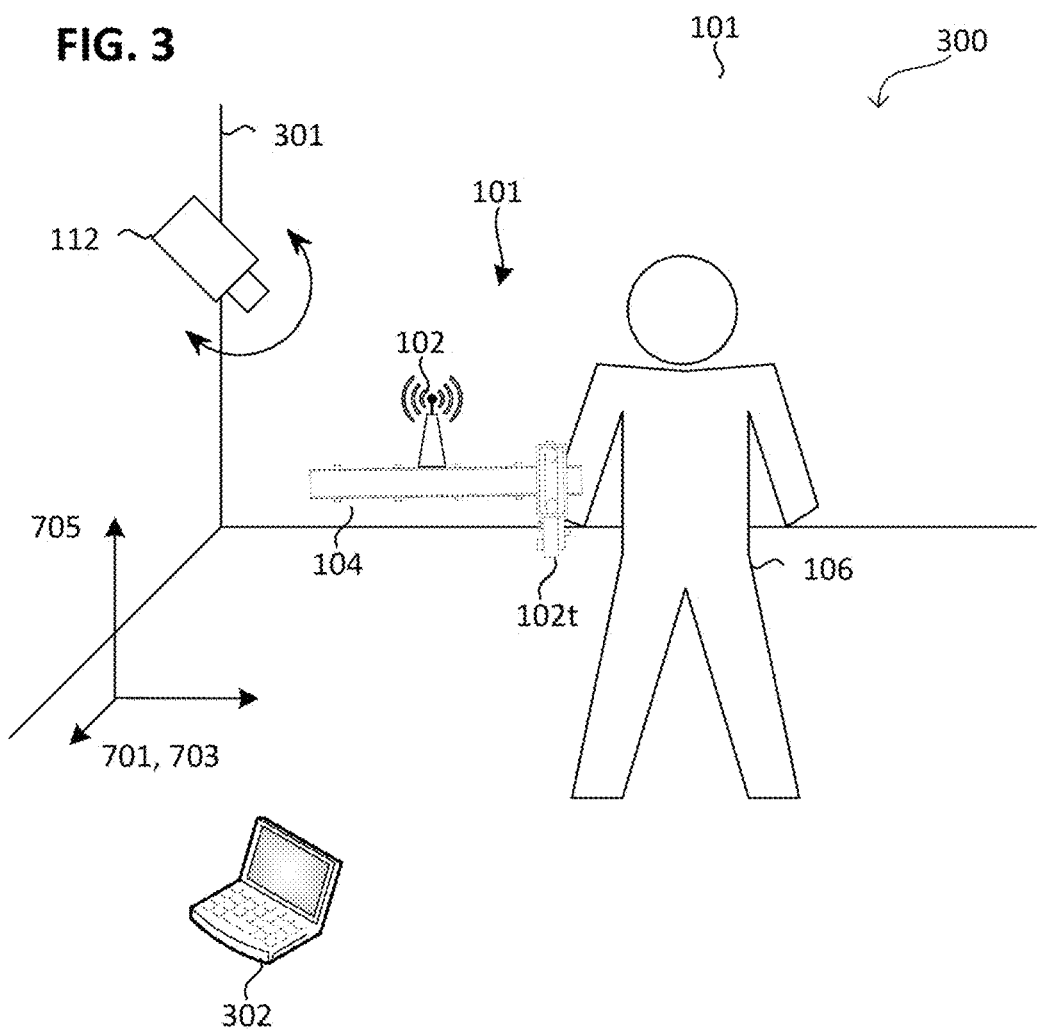

METHOD, SYSTEM AND NONVOLATILE STORAGE MEDIUM

RELATED APPLICATIONS

This application is a National Phase of PCT Application PCT/EP2020/056052, filed on Mar. 6, 2020, which claims priority to German Application 10 2019 105 820.1, which was filed on Mar. 7, 2019, both of which are incorporated herein in their entirety by reference.

TECHNICAL FIELD

Different example embodiments relate to a method, a system and a non-volatile storage medium.

BACKGROUND

Both the programming of an industrial robot and the programming of the associated plant control are conventionally vendor-dependent and robot-dependent. The programming is normally implemented in the form of program code by one or more than one specially trained expert. The programming is therefore complex and expensive, particularly for a track-based application (e.g. welding, gluing, painting).

The costs make automation by means of an industrial robot (also referred to simply as a robot) commercially unattractive for small and medium-sized enterprises, since these enterprises do not support the production of high quantities with little production variability which could offset the costs. Conversely, the low degree of flexibility of the programming may be unattractive for large enterprises. Conversion of the programming is time-consuming, resulting in shorter and uneconomic production cycles.

The complexity of the programming increases due to the integration of the industrial robot with its wide variety of components, such as, for example, an end effector (e.g. a glue gun), a sensor system (e.g. a camera) and a control system (e.g. a programmable logic controller—PLC). In this respect, the following aspects are conventionally considered and handled: movement planning and movement control in the form of a trajectory, integration and control of the tools attached to the robot, process logic, including fault detection and handling, process parameters and possible adaptations to changed boundary conditions, and integration of the control of the robot into the control of the plant as a whole.

The programming of an industrial robot may be performed, for example, manually by an expert. This currently still applies to more than 96% of the applications. A programmer manually writes the program code which causes the robot to perform the application autonomously in execution time.

The programming of an industrial robot may alternatively or additionally be performed by the expert by means of a CAD-based code generation. A virtual representation of reality (also referred to as a virtual world) is created and the robot is programmed in the virtual world. Along with the simulation, this also enables simpler accessibility. However, this CAD-based code generation may not readily be implemented by a technical layman. In addition, the virtual world often differs significantly from reality. Even slight differences may result in considerable discrepancies in the work of the robot in reality. For this reason, the program code which is generated by means of the code generation is normally additionally adapted by a programmer.

A teaching method (also referred to as teach-in) is conventionally used as an alternative to all-manual programming.

The robot may be controlled, for example manually, for the teaching method. A sensitive robot (also referred to as a cobot) may, for example, also be manually operated. The trajectory (i.e. the track on which the robot is intended to move) may be indicated with both mechanisms. However, activities extending beyond the trajectory which the robot is intended to perform still remain complex and are not therefore taken into consideration by the teaching method. The complexity consists, for example, in the integration of the wide variety of components of the robot, such as the end effector, the sensors and the control system, into the process to be performed which must therefore be programmed manually.

The teaching method may alternatively or additionally be performed via an interactive input device. A vendor-specific input device, such as, for example, a 6D mouse or an interaction pen, is conventionally used for this purpose. Similar to manual control or manually operated control, only the trajectory may similarly be taught in this case. The integration of the different components of the robot is therefore performed manually via programming.

The teaching method may alternatively or additionally be performed by means of sensor data processing. To do this, different extensions for the end effector of a robot equipped for this purpose may be provided which integrate a sensor system (e.g. a camera) directly into the robot control. Due to technical limitations, this has hitherto been applicable only to a pick-and-place application.

Generally speaking, a manual programming component is conventionally always involved. A common feature of these conventional methods is therefore that the implementation may not be undertaken completely by a technical layman if the manual programming component exceeds his capabilities. The reason for this is that the application as a whole involves an interaction of a variety of factors (such as, for example, the trajectory, the end effector control, the sensor data processing and the integration into the process control). Simple teaching methods therefore concentrate solely on the specification of the trajectory. The teaching method with sensor data processing is based on sensors which are attached directly to the robot. However, the visibility range is frequently restricted by the end effector and robot. In addition, changing light conditions or air particles (e.g. during painting) adversely affect the sensors on the robot.

SUMMARY

According to different embodiments, a method, a system and a non-volatile storage medium are provided which simplify the automation of a process flow.

According to different embodiments, a method may comprise: determining a machine-independent process model on the basis of data, wherein the data represent a handling of a work tool when performing a process flow, wherein the process flow comprises a plurality of sub-processes, wherein the process model links a process activity with spatial information of the sub-process for each sub-process of the plurality of sub-processes; mapping the machine-independent process model onto a machine-specific control model of a machine using a model of the machine, wherein the machine-specific control model defines an operating point of the machine for each sub-process of the plurality of sub-processes, said operating point corresponding to the process activity and to the spatial information of the sub-process.

The data may represent the handling of the work tool in the performance of the process flow by means of the work tool.

According to different embodiments, a machine-unspecific process model is shown to be created which describes the entire human process of the process task to be completed. The process model may be created, for example, by tracking how the process task is performed by a person.

The machine-unspecific process model is then converted into a machine-specific control model which is tailored to the hardware platform (generally also referred to as the machine) which is intended to perform the process task in an automated manner. Machine-specific information of the selected hardware platform is taken into account.

The control program which the hardware platform, e.g. its PLC (programmable logic controller), may execute, may then be formed from the machine-specific control model.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiment. In the following description, various embodiments are described with reference to the following drawings, in which:

FIGS. 1 and 3 in each case show a method according to different embodiments in a schematic side view;

FIGS. 2 and 4A in each case show a method according to different embodiments in a schematic flow diagram;

DETAILED DESCRIPTION

Figure 4A:
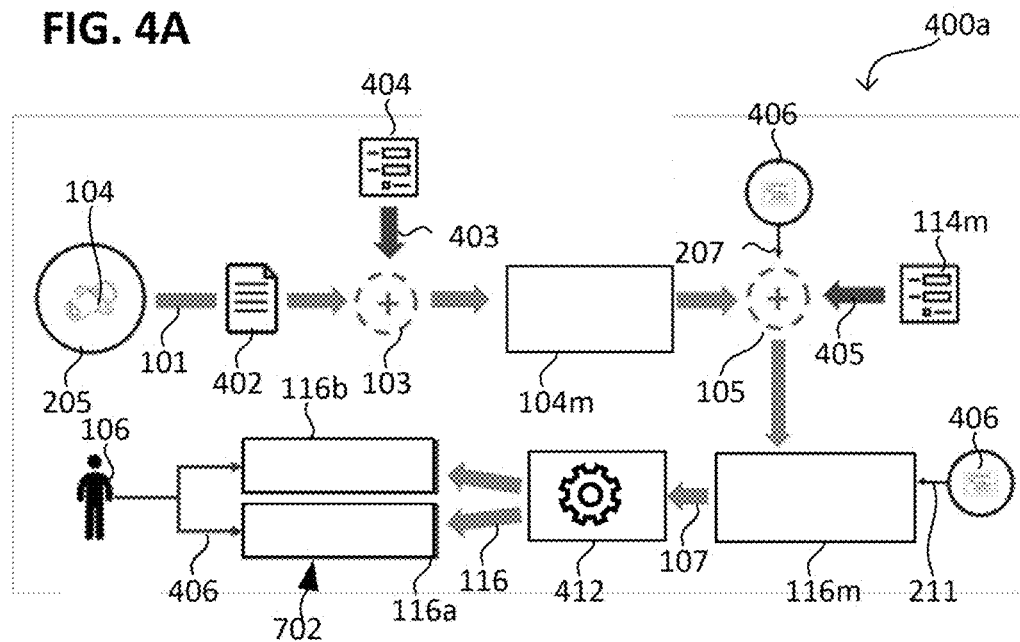

In the following detailed description, reference is made to the attached drawings which form part thereof and in which specific embodiments are shown by way of illustration. In this respect, direction terminology, such as "above", "below", "in front", "behind", "front", "rear", etc., is used in relation to the orientation of the described figure(s). Since components of example embodiments may be positioned in a number of different orientations, the direction terminology serves for illustration and is in no way limiting. Other embodiments may obviously be used and structural or logical modifications may be made without departing the protective scope of the present invention. The features of the different example embodiments described herein may be combined with one another, unless specifically indicated otherwise. The following detailed description is therefore not to be interpreted in a limiting sense, and the protective scope of the present invention is defined by the attached claims.

In the context of this description, the terms "linked", "connected" and "coupled" are used to describe both a direct and an indirect link, a direct or indirect connection, and a direct or indirect coupling, e.g. a mechanical, hydrostatic, thermal and/or electrical, e.g. direct or indirect, connection and/or interaction. Identical or similar elements are denoted with identical reference numbers in the figures, insofar as this is appropriate. A coupling may be configured to transfer a mechanical interaction (e.g. force, torque, etc.).

The term "processor" may be understood to mean any type of entity which allows the processing of data or signals. The data or signals may be processed according to at least one (i.e. one or more than one) specific function which is executed by the processor. A processor may have or may be formed from an analog circuit, a digital circuit, a mixed signal circuit, a logic circuit, a microprocessor, a central processing unit (CPU), a graphics processing unit (GPU), a digital signal processor (DSP), a field-programmable gate array (FPGA), an integrated circuit or any combination thereof. Any other type of implementation of the respective functions which are described in more detail below may also be understood to mean a processor or logic circuit. One or more of the method steps described in detail herein may obviously be executed (e.g. implemented) by a processor, by means of one or more specific functions which are executed by the processor.

The term "system" may be understood to mean a set of interacting entities. The set of interacting entities may have or may be formed from at least one mechanical component, at least one electromechanical transducer (or other types of actuators), at least one electrical component, at least one instruction (e.g. coded in a storage medium), and/or at least one control device.

The term "actuator" may be understood to mean a component which is configured to influence a mechanism or process in response to a control. The actuator may convert instructions (the "control") which are output by the control device into mechanical movements or changes in physical parameters such as pressure or temperature. The actuator, e.g. an electromechanical converter, may be configured, for example, to convert electrical energy into mechanical energy (e.g. through movement) in response to a control.

The term "control device" may be understood to mean any type of logic-implementing entity which may have, for example, circuitry and/or a processor which may execute software which is stored in a storage medium, in firmware or in a combination thereof, and may output instructions on the basis thereof. The control device may be configured, for example by means of code segments (e.g. software), to control the operation of a system (e.g. its operating point), e.g. of a machine or plant, e.g. at least its kinematic chain.

Control may be understood to mean an intentional influencing of a system. The state of the system may be modified in accordance with a specification using an actuator. Regulation may be understood to mean control, wherein a change of state of the system due to faults is additionally counteracted. The control may clearly have a forward-directed control path and may thus clearly implement a process control which converts an input parameter into an output parameter. However, the control path may also be part of the control loop, so that a regulation is implemented. In contrast to forward-only control, the regulation has a continuous exertion of influence by the output parameter on the input parameter which is effected by means of the control loop (feedback).

A process flow may be understood to mean the sum of all procedures (e.g. a temporal sequence of controlled events) which perform a predefined process task. The sub-processes of the process flow may each perform a subtask (i.e. a part of the process task). Depending on the type of the process flow, the individual sub-processes may be interlocked and/or may build on one another, e.g. may take place in a strict sequence, and/or may be independent from one another, e.g. interchangeable. A conditional sub-process may be performed, started or ended, for example, precisely when a process situation assigned to it occurs, e.g. a threshold value for a measured quantity is understepped or a pattern recognition recognizes the workpiece to be processed.

A process activity and at least one vector of the process activity may be assigned to each sub-process. The vector may define at least one position, a change therein, a spatial distribution and/or at least one direction of the process activity. The spatial details relating to the process activity described in simplified form by means of the vector may also be more complex or more detailed (referred to more generally herein as spatial information). A time indication relating to the process activity and defining e.g. the duration, start, end and/or a timing of the process activity may optionally be assigned to the spatial information.

If the process flow is performed by a manually operated work tool, the process activity may describe the sum of procedures which are performed by means of the work tool in order to provide the corresponding effect for achieving the process task on a work tool (i.e. to perform the sub-task). The corresponding spatial information may describe where and/or with which distribution the effect is intended to be provided and/or in which spatial location (i.e. position and/or orientation) the work tool is placed for this purpose. The handling of the work tool may describe the manner in which the work tool is operated and/or actuated in the performance of the process flow, e.g. how it is held, how firmly it is applied, and/or how long the procedure is carried out.

A model may be understood to mean a data-based (e.g. digital and/or virtual) representation of an original, e.g. a physical object (e.g. a machine) or a procedure (e.g. a control procedure or a process flow). The original may be abstracted, parameterized and/or simplified in order to form the model (the "model formation", i.e. the mapping of the original onto the model). The model may comprise, for example, physical information (e.g. length, distance, weight, volume, composition, etc.), movement-related information (e.g. position, orientation, direction of movement, acceleration, speed of movement, etc.), logical information (links, sequence, couplings, interactions, dependencies, etc.), time-related information (e.g. time, total duration, frequency, cycle duration, etc.), and/or functional information (e.g. current intensity, effect, characteristic diagram or characteristic curve, operating point space, force, degree of freedom, etc.) relating to the original.

The control model may correspondingly designate a formal representation of an automated control. The control model may have a plurality of instructions for the control (e.g. to move the machine into an operating point) and furthermore criteria whose fulfilment instigates, ends or maintains the instruction assigned to them. The control model may further have a control logic which logically interlinks a plurality of criteria and/or a plurality of instructions, and which implements a flow (e.g. a flow diagram) according to which the control is performed.

The process model may similarly designate a formal representation of a process flow. The process model may have a plurality of links between a process activity and the corresponding spatial information and may optionally assign corresponding process situations to the process activities which, for example, occur in, determine or end the process activity. The process model may further have a process logic which logically interlinks a plurality of process situations and/or a plurality of process activities, and/or which implements a flow (e.g. a flow diagram) according to which the process flow is performed. The process situation may determine, for example, a process activity assigned to it according to the spatial information (which represents the conditional sub-process). The same process activity may clearly take place, e.g. at different locations, depending on the process situation which occurs.

Generally speaking, a flow diagram may have at least branches, jumps and/or loops. The presence or absence of a process situation may generally be represented by means of at least one criterion which is satisfied, for example, if the process situation is present or absent.

The mapping may comprise the conversion of elements of an output quantity (also referred to as an archetype) into a target quantity, wherein the elements of the target quantity are then the replica (mapping) of the archetype. The mapping may assign at least one element of the mapping to each element of the archetype. The mapping may comprise applying, for example, operators, transformations and/or links to the elements of the output quantity. The elements may generally comprise: logical connections, links, information, characteristics, coordinates or the associated coordinate system, mathematical objects (such as formulae or numbers), procedures, activities, etc.

A code generator may be understood to mean a computer program which is configured to convert a model which is present e.g. in a modelling language into a programming language, e.g. the programming language of the control device of the machine. Alternatively or additionally to the modelling language, e.g. a unified modelling language (UML), the model may, however, also be present in a markup language, a structure chart, a decision table or a different formal language. The code generator generates code segments (also referred to as code generation) which may be combined with other optional program parts to form a program.

The spatial location (also referred to as location information or simply location) may be understood herein to mean the spatial information of the orientation and/or position of an object. The position may clearly describe the place (e.g. a point) in space and the orientation may describe the respective orientation (e.g. a direction) of an object in relation to space. A trajectory may be understood to mean a sequence of spatial location information elements which are successively adopted by an object. The location information may optionally be time-dependent (i.e. movement-related, then also referred to as movement), according to a timing or speed, so that a movement along the trajectory is taken into account. Generally speaking, the spatial location information or other spatial information in three-dimensional space may generally be described by means of Cartesian coordinates. However, a different coordinate system may also be used, e.g. cylindrical coordinates.

FIG. 1 shows a method 100 according to different embodiments in a schematic side view.

FIG. 1 further shows a machine 114 to be programmed. The machine 114 to be programmed may be a robot, e.g. an industrial robot, for the handling, assembly or processing of a workpiece. The method 100 enables, for example, the end-user programming of the complete automation application (including process parameters and integration) by a technical layman.

The machine 114 to be programmed may generally have a manipulator 114$p$, 114$e$ and a frame 114$u$ on which the manipulator 114$p$, 114$e$ is supported. The term manipulator 114$p$, 114$e$ summarizes the entirety of the moving elements 114$v$, 114$g$, 114$e$ of the machine 114 whose control enables a physical interaction with the environment, e.g. in order to perform a process flow. For the control, the machine 114 may have a control device 712 which is configured to implement the interaction with the environment according to a control program. The final element 114e of the manipulator 114p, 114e (also referred to as an end effector 114e) may have one or more than one tool, such as, for example, a welding torch, a gripping instrument, a painting facility or the like.

The manipulator 114p, 114e may have at least one positioning device 114p, for example a robot arm 114p (also referred to more generally as an articulated arm), to which the end effector 114e is attached. The robot arm 114p is shown as providing a mechanical arm which may provide functions similar to those of a human arm.

The elements of the positioning device 114p may, for example, be connection elements 114v and link elements 114g, wherein the connection elements 114v are interconnected by means of the link elements 114g. A link element 114g may have, for example, one or more links, wherein each link may provide the connection elements 114v connected thereto with a rotatory movement (i.e. a turning movement) and/or a translational movement (i.e. a displacement) in relation to one another. The movement of the link elements 114g may be instigated by means of actuators which are controlled by the control device 702.

In 101, a sensor arrangement 102 (having at least one tracker) may be mounted onto a work tool 104. A person 106 performs an activity to complete the process task by means of the work tool 104 to which the sensor arrangement 102 is attached (e.g. painting, manufacturing and/or assembling a component). The work tool 104 may, for example, be any manually operated work tool 104 which a human worker 106 may use, move, hold, lift and/or handle in his activity during his activity (e.g. a handheld screwdriver, a paint spray gun, a cordless screwdriver or a glue gun).

The sensor arrangement 102 meanwhile transmits data to an external receiver, said data being captured via an integrated sensor system of the sensor arrangement 102. The data may represent, for example, a location and/or a movement (e.g. acceleration and/or speed) of the sensor arrangement 102 in space, and also optional data from at least one actuation sensor (e.g. a button or switch, also referred to more generally as a trigger) which detects an actuation on the work tool 104 (e.g. when and/or with what strength the removal is actuated).

The external receiver thus receives the time-dependent location of the sensor arrangement 102 in space 701, 703, 705. The time-dependent location of the work tool 104 may be determined on this basis. Data from an additional external sensor system 112 (also referred to as an additional sensor arrangement 112) and/or PLC data may optionally be received by the receiver. The additional sensor arrangement 112 may generally be configured as stationary and may have, for example, a laser scanner, a camera and/or a distance sensor.

As a result, time-based data describing the complete process flow are captured and recorded, for example at high frequency, by means of the sensor arrangement 102, 112.

These data may optionally have activity-specific process parameters, as described even more precisely below. Activity-specific process parameters may comprise the parameters of the respective function and/or of the operating point of the work tool 104 (e.g. a volume flow of the paint spray gun).

In 103, a platform-independent model 104m (also referred to as a process model 104m) of the process task may be determined on the basis of the data and the optional activity-specific process parameters. This process model 104m clearly describes the entire human process of the process task. The process model 104m may optionally be examined and adapted by a person 106.

In one example, the incoming data are time-based movement data of the work tool 104 held by the person, data from the trigger(s) and data from further external sensors which are synchronized via timestamps and are related to one another. These data are preprocessed. The data quantity is reduced without significant losses in the validity of the data. The temporal sequence of the data is then split via task-specific analytical algorithms into sub-processes (e.g. adoption of the starting position, start of the painting procedure, painting, completion of the process). An instance of a platform-independent process model 104m is then generated, e.g. in the form of a metamodel. The metamodel describes the data types of the model instance and their possible relations. In this case, a model is, by way of example, a directed graph with typed nodes. Nodes have a data type (nodes of the metamodel) which describes the parameters of the model and their value ranges. The generation of the model instance on the basis of the input data is performed with the aid of, for example, artificial neural networks. The artificial neural networks (ANNs) may be trained with conventional training methods, for example the back propagation method. In the training, the training vectors are determined according to the respectively desired input parameters (for example spatial coordinates of the partial object of the work tool, associated time indication, operating points/control points of the work tool, process parameters of the work tool, spatial orientation (location information) of the work tool, etc.). It should be noted that both the parameters contained in the input vector of the ANN and the parameters contained in the output vector of the ANN are strongly application-dependent or process-dependent and are selected accordingly.

A specific hardware platform 114 (also referred to more generally as a machine 114) may further be selected (e.g. a specific robot type or end effector, etc.). The machine characteristics (e.g. design) of the machine 114 may be taken into account by means of a model 116m of the machine 114.

In 105, software may generate a platform-specific model 116m (also referred to as a control model 116m) for a robot control 702 on the basis of the model 114m of the machine 114 and the process model 104m. The machine-specific process parameters (e.g. volume flow on the painting end effector and/or movement flows), for example, which correspond to the activity-specific process parameters may be determined.

In one example, the incoming data are an instance of the platform-independent metamodel (more generally the platform-independent model 104m) and additional information relating to the automation devices (robots, end effectors, etc.) that are used. The platform-independent model 104m is transformed into the platform-dependent model 116m via a model-to-model transformation. The platform-dependent model 116m is similarly described via a metamodel. Similar to the platform-independent model 104m, the platform-dependent model 116m describes the data types and relations of the platform-independent models 104m. The model transformation describes a mapping function indicating how nodes or groups of nodes from the platform-independent model 104m are mapped onto nodes or node groups of the platform-dependent model 116m. The interrelationships of these generated nodes are additionally described. The mapping is performed, for example, taking into account the respective characteristics/features of the respectively used platform, for example machine.

A model of the machine may, for example, contain and therefore take account of the following:
- physical information (i.e. the physical architecture) of the machine, e.g. length of the end effector and/or length of the components of the positioning device;
- information relating to the characteristic diagram or characteristic curve of the machine, e.g. maximum gripping force of the end effector and/or degrees of freedom or range of movement of the positioning device;
- the logical architecture of the machine, e.g. the interaction and logical interlinking of the individual components (e.g. actuators) of the machine;
- the specific or potentially available tool selection or the tool characteristics thereof;
- parameters of the control path or the control loop, e.g. control parameters or regulation parameters, input parameter of the individual actuators or output parameters of the individual sensors;
- programming-specific information, e.g. programming language, programming interface, etc.
- the coordinate system of the machine, e.g. in each case the partial coordinate systems of the individual actuators or link elements of the machine that are stacked inside one another, origin of the individual partial coordinate systems, final positions of the partial coordinate systems;
- permissible operating parameters of the machine, such as, for example, the maximum operating temperature.

The mapping clearly describes the influence of the characteristics of an in each case specifically used platform (for example a machine) on the abstract process flow according to the process model.

In 107, a program code 116 (e.g. a source code) may be generated on the basis of the control model 116m by means of a code generator 412. The program code 116 may designate the respective code in which the control program 116 is written. Depending on the process task, information technology infrastructure and specific requirements, different target platforms may be operated on which the program code 116 is intended to be executed. The program code 116 may be generated for a complete communicating system (e.g. the robot control and the PLC control). The program code 116 may optionally have predefined parts at which the program code 116 may be adapted by a developer.

In one example, the code generation takes place in the form of templates which exist for each target language. These templates have instances of the platform-dependent model as input and describe how text fragments are generated therefrom at metamodel level. In addition, along with a text-only output, these templates also have control structures (e.g. branches). A template engine in turn has a template and an instance of the platform-independent model as input and generates one or more text files therefrom.

FIG. 2 shows the method 100 according to different embodiments in a schematic flow diagram 200.

In 101, the method 100 may comprise: attaching 201 a mobile sensor arrangement 102 to the work tool 104 of the manual process flow which is intended to be performed by the machine 114 (e.g. an industrial robot). The process flow is, for example, track-based (such as e.g. for gluing, welding, painting or milling).

The sensor arrangement 102 may be attached magnetically, with clamping screws, with a clip or a hook-and-loop fastener to the work tool 104 and may optionally be attached sequentially to a plurality of work tools 104 of the manual process flow.

The sensor arrangement 102 may have one or more than one sensor, e.g. a plurality of different sensor types, e.g. in each case for the measured quantities to be measured differently (e.g. for location, acceleration, etc.). The sensor arrangement 102 may optionally have one or more than one mobile unit, wherein each mobile unit has at least one sensor of the sensor arrangement 102, e.g. a mobile unit with a trajectory sensor (also referred to as a tracker). The or each mobile unit may be configured autonomously, e.g. for its own energy supply and/or for wireless communication. A plurality of sensors, for example, may be accommodated jointly in one housing of a mobile unit (also referred to as internal sensors).

A sensor (also referred to as a detector) may be a converter which is configured to measure a characteristic of its environment qualitatively or as a measured quantity corresponding to the sensor type, e.g. a physical or chemical property and/or a material characteristic. The measured quantity is the physical quantity to which the measurement by means of the sensor applies.

Depending on the context of the measured quantity, for example of a specific sensor type, a sensor may be, for example, an operating point sensor, an actuation sensor or a trajectory sensor. The operating point sensor may detect, for example, the operating point of the work tool 104. The trajectory sensor may detect, for example, a movement and/or the location (i.e. the orientation and/or position).

The sensor arrangement 102 may have, for example, at least one optoelectronic sensor (e.g. a camera), at least one trajectory sensor and/or at least one operating point sensor (e.g. throughput sensor). The trajectory sensor may have, for example, a movement sensor (e.g. having an acceleration sensor and/or a speed sensor) and/or a location sensor (e.g. having an orientation sensor and/or a position sensor).

The sensor arrangement 102 and/or the additional sensor arrangement 112, for example, may have at least one sensor which is configured to measure an electrodynamic characteristic (e.g. current, voltage, magnetic field or power), at least one sensor which is configured to measure a location-related characteristic (e.g. orientation and/or position), at least one sensor which is configured to measure a movement-related characteristic (e.g. speed and/or acceleration), at least one sensor which is configured to measure a thermal characteristic (e.g. temperature or temperature difference), at least one sensor which is configured to measure a geometric characteristic (e.g. distance, solid angle, volume), at least one sensor which is configured to measure a photometric characteristic (e.g. light intensity, brightness, color, energy or power), and/or at least one sensor which is configured to measure a mechanical characteristic (e.g. force, pressure, mass, energy, power, torque, actuation, etc.).

At least one (i.e. one or more than one) sensor of the sensor arrangement 102 may optionally be provided separately by the mobile unit. The at least one sensor may have, for example, an actuation sensor and/or an operating point sensor. The at least one sensor may be attached to the manual work tool 104, e.g. of a supply device of the manual work tool 104 (e.g. to measure a volume flow, a temperature or a current intensity). The manual work tool 104 may, for example, be a hand-held tool which is supplied by a stationary supply device e.g. with a fluid or with energy.

The operating point may describe the point in the characteristic diagram or on the characteristic curve of a technical device which is adopted on the basis of the system characteristics and acting external influences and parameters of the device. The operating point may clearly describe which operating state the device has.

In 101, the method 100 may optionally further comprise: calibrating 203 the sensor arrangement 102. The calibration may comprise calibrating the position of the sensor arrangement 102 in relation to the coordinate system of the work tool 104, the additional sensor arrangement 112 and/or a global coordinate system. The global coordinate system may, for example, be stationary, i.e. may have an invariant location in relation to the earth's surface.

The calibration may comprise, for example: detecting the location of the sensor arrangement 102 in relation to the work tool 104. The calibration may alternatively or additionally comprise: detecting the location of the sensor arrangement 102 in space, e.g. in relation to the global coordinate system. By means of the two location information elements which describe the sensor arrangement 102 relatively in space and relative to the work tool 104, the trajectory 111 of the work tool 104 may be determined on the basis of the trajectory of the sensor arrangement 102 (cf. FIG. 1).

In 101, the method 100 may comprise: manually performing 405 the process flow. Manually performing 405 may be understood to mean that the work tool 104 is carried and/or actuated by hand (i.e. by a person). The work tool 104 may, for example, be a work tool carried or at least moved by muscle power.

During the performance 005 of the process flow, at least one sensor arrangement 102, 112 may transmit data to the external receiver and/or the external receiver may detect the position and movement of the sensor arrangement 102 in space, e.g. by means of the additional sensor arrangement 112. A signal transmission, for example, to the external receiver may take place via a radio link (e.g. Bluetooth). Alternatively or additionally, the sensor arrangement 102 may have at least one trigger which is coupled to a user interface of the work tool 104. The trigger may detect, for example, the manual control of the work tool 104 at the user interface.

During the performance 405 of the process flow, the trajectory 111 (e.g. location and/or movement) of the sensor arrangement 102 may alternatively or additionally be detected by means of at least one camera 112 or a different sensor type 112, e.g. by means of a laser scanner 112, a distance sensor 112, a sonar sensor 112 and/or a radar sensor 112.

In 103, the method 100 may further optionally comprise: transmitting the data captured in 191 (e.g. during 203 and/or 205) to a processing unit 302 (cf. FIG. 3) and optionally supplementing the data with stored activity-specific process parameters of the process flow in order to form the process model 104*m*. The movement data or the trajectory 111 may further be optionally smoothed (e.g. so that they are as linear as possible along the axes of movement).

The stored parameters of the process flow may optionally have boundary conditions, such as, for example, representing optimum values and/or limit values Alternatively or additionally, the stored parameters may further specify the process flow, such as, for example, the operating speed, hold time, compressive force, etc.

The determined process model 104*m* may be configured as platform-independent, i.e. not relating to a specific robot 114.

In 105, the method 100 may comprise: converting 209 the process model 104*m* into the control model 116*m*. For this purpose, the process model 104*m* may be processed with stored machine-specific information 114*m* of one or more different machines 114 in order to form the control model 116*m* (also referred to as the process-specific and machine-specific model 116*m*) for the machine 114. The sum of the machine-specific information 114*m* may also be referred to as the model 114*m* of the or each machine 114.

The machine-specific information 114*m* may comprise machine-specific parameters, such as positioning accuracies and repetition accuracies, maximum range of movement, speeds, acceleration, etc. Alternatively or additionally, the machine-specific information 114*m* may represent at least one tool 114*e* of the machine 114 (also referred to as the machine tool 114*e*) which is attached, for example, to the positioning device 114*p* of the machine 114.

In 103, the method 100 may optionally comprise: postprocessing 207 the process model 104*m*. In 105, the method 100 may optionally comprise: postprocessing 211 the formed control model 116*m*. The postprocessing 207 may be performed, for example, by a user with the aid of a user interface 406 and/or (application) software (e.g. executed on a PC, tablet or smartphone, cf. FIG. 4A). In 207 or 211, the method may optionally comprise: visualizing and simulating the control model 116*m* or process model 104*m* in a virtual environment, and/or editing the trajectory 111, 113, the process logic, the process parameters and integrating and controlling the tools attached to the machine by the user. The optional visualization of a spatial sub-model 502 of the process model 104*m* may be performed, for example, with the representation of the corresponding workpieces (cf. FIG. 5).

In 107, the method 100 may further comprise: generating code for one or more than one machine 114, optionally of a different type, optionally taking account of possible different PLX control systems. A control program 116 which is executable by the corresponding machine 114 may be formed by means of the code generation 107.

The code generation 107 takes place, for example, in the form of templates which exist for each target language. These templates have instances of the platform-dependent model as input and describe how text fragments are generated therefrom at metamodel level. In addition, along with a text-only output, these templates also have control structures (e.g. branches). A template engine in turn has a template and an instance of the platform-independent model as input and generates one or more text files therefrom.

The code generation 107 may be performed, for example, for a robot control 702 and/or a PLC control 702. The code generation 107 may generate, for example, human-readable code segments (i.e. source code) and/or machine-readable code segments (i.e. machine code) 107. The source code may be generated for different target languages, e.g. depending on the target language that is suitable for the corresponding machine. The source code may optionally be adapted and processed subsequently, e.g. by a developer, for example by means of the user interface 406.

FIG. 3 shows the method 100 according to different embodiments in a schematic side view 300.

The sensor arrangement 102 may, for example, enable a software-supported method 100 for teaching an industrial robot, said method also being accessible to a technical layman 106. A non-programmer 106, for example, may thus be enabled to teach an industrial robot 114 in a fully integrated manner.

At least one task expert 106 (e.g. a mechanic or a welder) may demonstrate one or more than one activity of the process flow by way of example by means of the method 100. The necessary control software of the robot 114, including all required software components, may be generated in a completely automated manner on that basis. The control model 116*m* provided by means of the method 100 is independent from the specific machine types and may thereby also be reused for any machine type, e.g. from a different vendor. A conversion of the machine 114 may thus be simplified.

In 101, the method 100 may comprise: capturing the data by means of the sensor arrangement 102 (here a physical sensor component) and/or an additional (here external) sensor arrangement 112. The or each mobile unit may be attached to a work tool 104 and may detect the location and/or the acceleration of the work tool 104 by means of at least one sensor integrated therein. In 101, the or each mobile unit of the sensor arrangement 102 may be attached to the work tool 104 by means of attachment devices (e.g. magnetically, by means of a clip, or hook-and-loop fastener).

Other measured quantities which represent the trajectory (e.g. location and/or movement) of the work tool 104 may also be captured.

The sensor arrangement 102 may further have at least one trigger 102t (e.g. a glue gun trigger) which detects a manual control of the work tool 104. The additional sensor arrangement 112 may detect the position of the sensor arrangement 102 in space 301. Both the data from the sensor arrangement 102 (e.g. its mobile unit) and the data from the external sensor system 112 may be transmitted in a temporally synchronized manner to a computing unit 302 (e.g. PC, laptop, etc.) which has the external receiver or has a communication connection thereto.

The sensor arrangement 102 may optionally be calibrated 203 in its location (i.e. position and/or orientation) relative to the work tool 104. The position and/or orientation of the sensor arrangement 102 may be determined, for example, in the coordinate system of the work tool 104. A calibration may further take place in a global coordinate system which links the coordinate system of the sensor arrangement 102 with the coordinate system of the machine 114 so that a transformation may take place between these systems.

FIG. 4A shows the method 100 according to different embodiments in a schematic flow diagram 400a.

In 101, a person may perform 205 the process flow by way of example once or multiple times with the actual work tool 104.

The process flow may comprise, for example, tightening a screw with an electric screwdriver 104. The sensor arrangement 102 and/or the additional sensor arrangement 112 may capture at least one measured quantity which represents a spatial location (and/or a change therein) of the work tool 104. More generally speaking, the trajectory 111 of the work tool 104 may be detected. The trajectory 111 of the work tool 104 may comprise, for example, information relating to a speed, a position, an acceleration and/or an orientation of the work tool 104.

Similarly, a function (and/or a change therein) provided by the work tool 104 may be detected in a parameterized manner, e.g. a rotational speed of a shaft of the work tool, a temperature of a heating device of the work tool, a current through a welding tip of the work tool, etc. Alternatively or additionally, it is possible to detect in a parameterized manner by means of the trigger 102t as soon as, as long as and/or with what strength of the work tool 104 the actuation takes place. More generally speaking, the trigger 102t may be configured to detect a manual control of the work tool 104, e.g. at a user interface of the work tool 104.

The data 402 collected in 101 may be transmitted to a computing unit 302 (or to a different processing unit) and may be augmented 403 there with activity-specific process parameters 404 (e.g. volume flow of a paint spray gun 104). The augmentation with activity-specific process parameters 404 may be performed, for example, automatically or manually (e.g. through user input).

In one example, the user may select the option from a range of work tools (e.g. paint spray guns) in the graphical interface of the computing unit for this purpose. Depending on the task, the process-specific parameters (e.g. volume flow) are then queried via an input form.

The computing unit 302 may create 103 the process model 104m (also referred to as the process-specific model) on the basis of the captured data 402, said model describing the process task without reference to a specific automation. The processing unit 302 may optionally be configured to modify, e.g. to optimize and/or abstract, the data 402. The modification may comprise, for example, thinning and/or smoothing the trajectory 111 (e.g. the movement data), identifying and/or optimizing sub-processes and making logical connections.

The process model 104m may optionally be postprocessed by means of a user interface 406 (e.g. provided on a PC, tablet or smartphone). Components (e.g. segments or individual points) of the trajectory 111 of the work tool 104 (also referred to as the work tool path 111), for example, may be adapted and/or fine-tuned. Alternatively or additionally, an actuation with the at least one trigger 102t may be tracked, modified and/or linked with the trajectory 111.

The process model 104m may further be augmented 405 with machine-specific information 114m (e.g. from the specific robot platform 114 or at least from the end effector 114e), e.g. machine-specific process parameters 114m (e.g. a volume flow on the painting end effector). The processing unit 302 may automatically determine the control model 116m from the process model 104m and the provided machine-specific information 114m. The control model 116m represents an automation script for a specific hardware platform 112 and hardware configuration.

In one example, the incoming data are an instance of the platform-independent metamodel (more generally the platform-independent model 104m) and additional information relating to the automation devices (robots, end effectors, etc.) that are used. The platform-independent model 104m is transformed into the platform-dependent model 116m via a model-to-model transformation. The platform-dependent model 116m is similarly described via a metamodel. Similar to the platform-independent model 104m, the platform-dependent model 116m describes the data types and relations of the platform-independent models 104m. The model transformation describes a mapping function indicating how nodes or groups of nodes from the platform-independent model 104m are mapped onto nodes or node groups of the platform-dependent model 116m. The interrelationships of these generated nodes are additionally described. The mapping is performed, for example, taking into account the respective characteristics/features of the respectively used platform, for example machine.

A model of the machine may, for example, contain and therefore take account of the following:
  physical information (i.e. the physical architecture) of the machine, e.g. length of the end effector and/or length of the components of the positioning device;
  information relating to the characteristic diagram or characteristic curve of the machine, e.g. maximum gripping force of the end effector and/or degrees of freedom or range of movement of the positioning device;
  the logical architecture of the machine, e.g. the interaction and logical interlinking of the individual components (e.g. actuators) of the machine;

the specific or potentially available tool selection or the tool characteristics thereof;

parameters of the control path or the control loop, e.g. control parameters or regulation parameters, input parameter of the individual actuators or output parameters of the individual sensors;

programming-specific information, e.g. programming language, programming interface, etc.

the coordinate system of the machine, e.g. in each case the partial coordinate systems of the individual actuators or link elements of the machine that are stacked inside one another, origin of the individual partial coordinate systems, final positions of the partial coordinate systems;

permissible operating parameters of the machine, such as, for example, the maximum operating temperature.

The mapping clearly describes the influence of the characteristics of an in each case specifically used platform (for example a machine) on the abstract process flow according to the process model.

The machine-specific control model 116m may optionally be postprocessed 211 by means of a user interface 406 (e.g. provided on a PC, tablet or smartphone). The trajectory 113 of the machine 114 (e.g. of the end effector 114e), for example, may be adapted and/or modified. Alternatively or additionally, transitions between different anchor points, travelling speeds, hold times or similar may be modified, e.g. specified. An error compensation and/or a communication path may optionally be defined with the plant control.

A program code 116 which may be executed on the control device 702 (also referred to as the controller 702) of the machine 114 and which, for example, fully implements the taught process flow may further be generated from the control model 116m.

In one example, the code generation takes place in the form of templates which exist for each target language. These templates have instances of the platform-dependent model as input and describe how text fragments are generated therefrom at metamodel level. In addition, along with a text-only output, these templates also have control structures (e.g. branches). A template engine in turn has a template and an instance of the platform-independent model as input and generates one or more text files therefrom.

An external system, e.g. a PC, PLC or similar, may optionally be used to control the end effector 114e. In this case, alternatively or additionally to the program code 116 for an internal control device 116a of the machine (also referred to as robot code), a program code 116 may be generated for the external system 116b and/or for the communication interface 116b to the latter.

More generally speaking, the machine 114 may have an internal 116a and/or external 116p control device 702 which is configured to control the end effector 114e and/or the positioning device 114p of the machine 114. The program code 116 may be executed by the control device 116a, 116b.

The program code 116 may designate the respective code in which the control program 116 is written. Depending on the process task, information technology infrastructure and specific requirements, different target platforms may be operated on which the program code 116 is intended to be executed. The program code 116 may be generated for a complete communicating system (e.g. the robot control and the PLC control). The program code 116 may optionally have predefined parts at which the program code 116 may be adapted by a developer.

The program code 116 may optionally be modified, e.g. adapted, subsequently, for example by means of a user interface 406 and/or by a person 106.

Figure 4B:
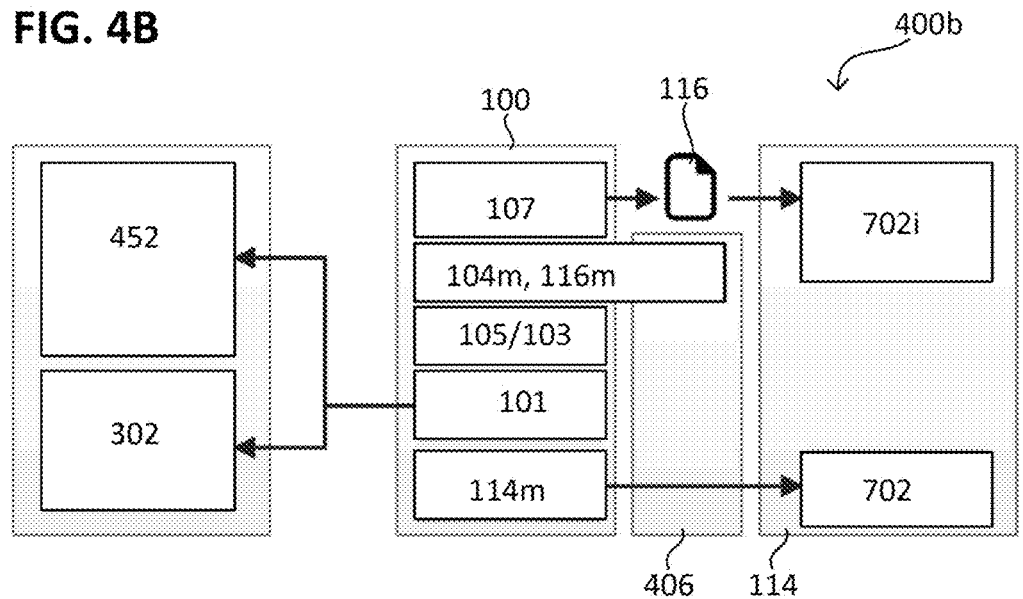
FIG. 4B shows a system for carrying out a method according to different embodiments in a schematic system diagram.

FIG. 4B shows a system 400b for carrying out the method 100 according to different embodiments in a schematic system diagram.

The system 400b may have at least one sensor arrangement 452, e.g. the sensor arrangement 102 attachable to the work tool 104 or the stationary sensor arrangement 112. The system 400b may further have at least one computing unit 302 which has one or more than one processor which is configured to carry out the method 100. The system 400b may optionally have a code generator 412 which is configured to convert 209 the machine-specific control model 116m into the control program 116. The system 400b may optionally have a machine 114 which has a control device 702 programmed with the control program 116 and a programming interface 702i by means of which the control program 116 is provided to the control device 702.

Figure 5:
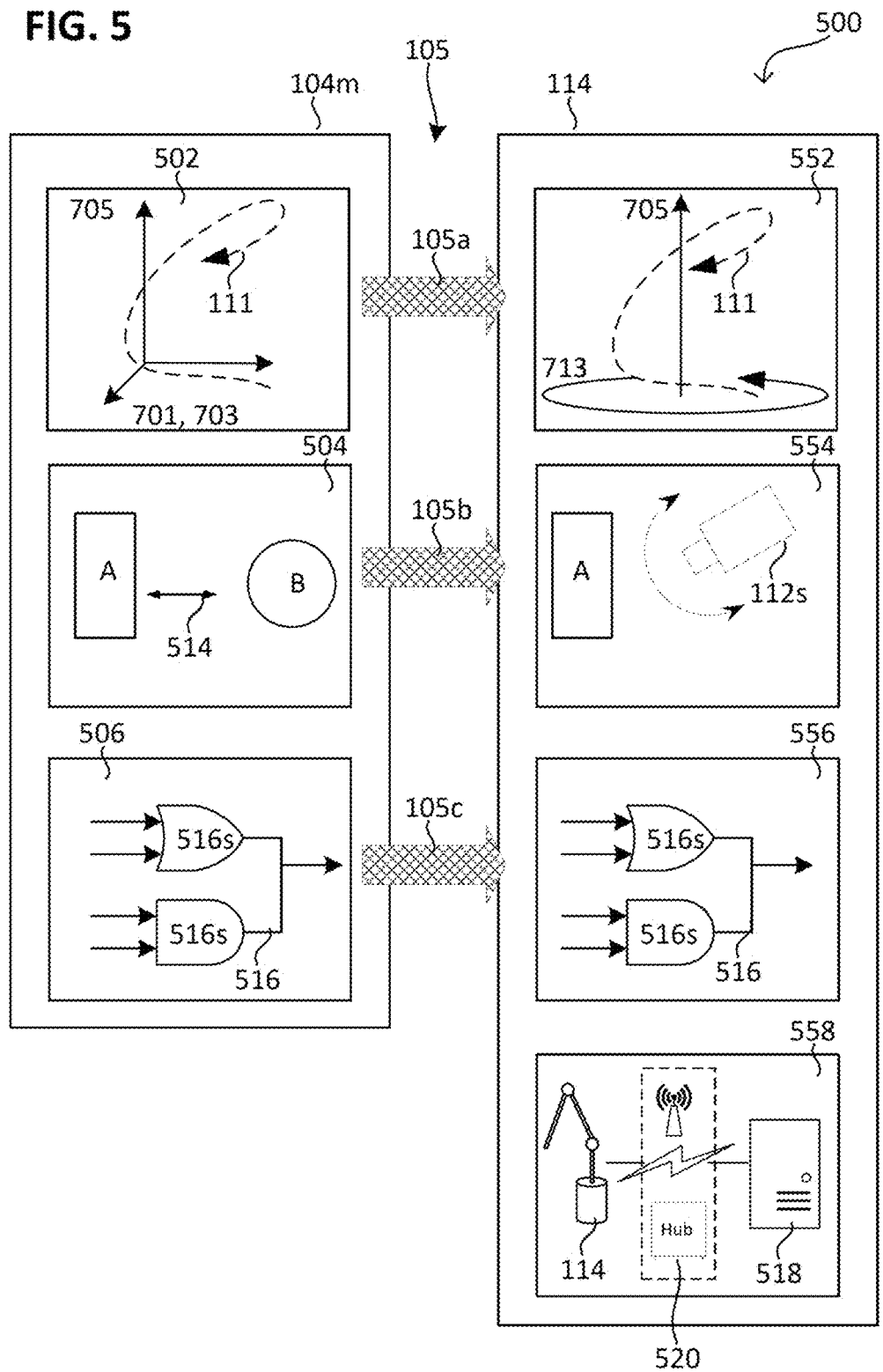
FIG. 5 shows the method according to different embodiments in a schematic model diagram.

FIG. 5 shows the method 100 according to different embodiments in a schematic model diagram 500.

The process model 104m (process-specific model) clearly describes a process task without reference to an underlying automation solution. The process model 104m may have a plurality of sub-models 502, 504, 506 (e.g. for each sub-process).

A first sub-model 502 (also referred to as the spatial model 502) may describe physical, geometric, location-related and/or movement-related characteristics, e.g. objects, their shape or position in the Cartesian space 701, 703, 705, and at least one trajectory 111 in the Cartesian space 701, 703, 705. The spatial model 502 may further describe Cartesian-annotated process activities (e.g. gripping an object) and/or the activity-related process parameters. The Cartesian space may be defined by directions 701, 703, 705 which are, for example, stationary.

The first sub-model 502 may optionally describe trajectories 111 or sections thereof which are alternatives to one another and which are referenced by means of a third model 506 (also referred to as a logic model 506). The spatial model 502 clearly describes how the process task is completed in the physical space 701, 703, 705 and which task-specific process activities (e.g. activating the spray function of a paint spray gun) are linked therewith. The process activities may be represented by at least one activity-related process parameter, e.g. by at least one location-related and/or movement-related process parameter (e.g. a speed) and/or at least one functional process parameter (e.g. a volume flow of a paint spray gun).

The spatial model 502 describes, for example, the position and rotation of the tool in the three-dimensional space over time.

A second sub-model 504 (also referred to as a machine-unspecific adaptation model) may describe which different process situations 514 may occur (e.g. painting of component A or component B) and/or how these process situations 514 may differ (e.g. on the basis of a shape of the component A or/or a shape of a component B), e.g. on the basis of criteria. The second sub-model 504, for example, describes a criterion for detecting a process situation 514 (e.g. by means of a camera for detecting the shape of the component). The second sub-model 504 optionally describes reference data for the criteria which have been recorded, for example, during the teaching 101 (e.g. example images of the components).

In one example, environment variables are defined for this purpose (e.g. shape of the component, temperature, etc.).

Situations are defined for specific value assignments of these environment variables on the basis of the environment variables (e.g. automobile door in cold environment). These situations may then be referenced in a logic model 506 in order to perform an adaptation of the automation process (e.g. travelling an alternative trajectory) or the process parameters (e.g. speed).

A third sub-model 506 (also referred to as a machine-unspecific logic model) describes the underlying process logic 516. The process logic 516 may have at least one control structure 516s (e.g. loop, branch, jump, call, etc.), e.g. of a programming language, and may link said control structure with the spatial model 502 and the adaptation model 504. A complex flow diagram may be represented in this way, e.g. "if component A has been detected, jump to path 111 with the process parameters annotated there".

The control model 116m may represent a fully integrated automation script for a specific hardware selection (positioning device 114p, control device 702 and/or end effector 114e). The control model 116m may have a plurality of sub-models 552, 554, 556, 558.

Similar to the physical model 502, an additional first sub-model 552 (also referred to as a physical model 552) clearly describes the spatial information, but in relation to the machine 114. Process-specific information, for example, may be transferred onto the coordinate system 705, 713 of the machine 114. The attachment and orientation of the end effector 114e of the machine 114 may be taken into account in order to map 105a the coordinate system 701, 703, 705 onto the coordinate system 705, 713 of the machine 705, 713, e.g. its tool 114e in the detection of the work tool 104 during the teaching process 101. The at least one activity-related process parameter of the first sub-model 502 may optionally be mapped 105a onto the specific tool of the end effector 114e (i.e. machine-specifically).

An additional second sub-model 554 (also referred to as a machine-specific adaptation model 554) may describe a plurality of parameters and situations. The parameters may have a name and a data type. It is possible, for example, by means of one or more than one criterion, to define how a process situation may be detected on the basis of specific parameter values (e.g. by means of a sensor of the machine 114). The dependence may be specified, for example, for determining the parameter values (also referred to as measured values) on the basis of available sensors 114s of the machine 114. The machine-specific adaptation model 554 may be derived by means of mapping 105b from the machine-unspecific adaptation model 504 and may optionally be further refined 211 by the user.

An additional third sub-model 556 (also referred to as a machine-specific logic model) may have a programming-language-independent representation of a procedural programming language with the control structures 516s (e.g. loops, conditions, etc.). The machine-specific logic model 556 may clearly interlink the other sub-models, e.g. the physical model 552, an interaction model 558 and the machine-specific adaptation model 556. The machine-specific logic model 556 may be determined by means of mapping 105c from the machine-unspecific logic model 506.

A fourth sub-model 558 (also referred to as an interaction model) may describe the integration of the automation script with possible external systems 518. The external system 518 may have at least one sensor (e.g. at least one camera), a control device or an enterprise resource planning system (ERP system).

At least one integration-specific protocol which embeds the machine 114 communicatively 520 into the system landscape may be defined for this purpose. The interaction model 558 may be determined, for example, on the basis of the machine-unspecific logic model 504 and may optionally be further refined 211 by the user.

The physical model 552 may clearly define movement procedures and movement sequences in combination with an activity of the end effector 114e. The interaction model describes how the machine 114 communicates in the system landscape (e.g. transmits and/or receives data to and/or from the external system 518). The machine-specific adaptation model 556 describes the conditions under which a given procedure is required.

Figure 6:
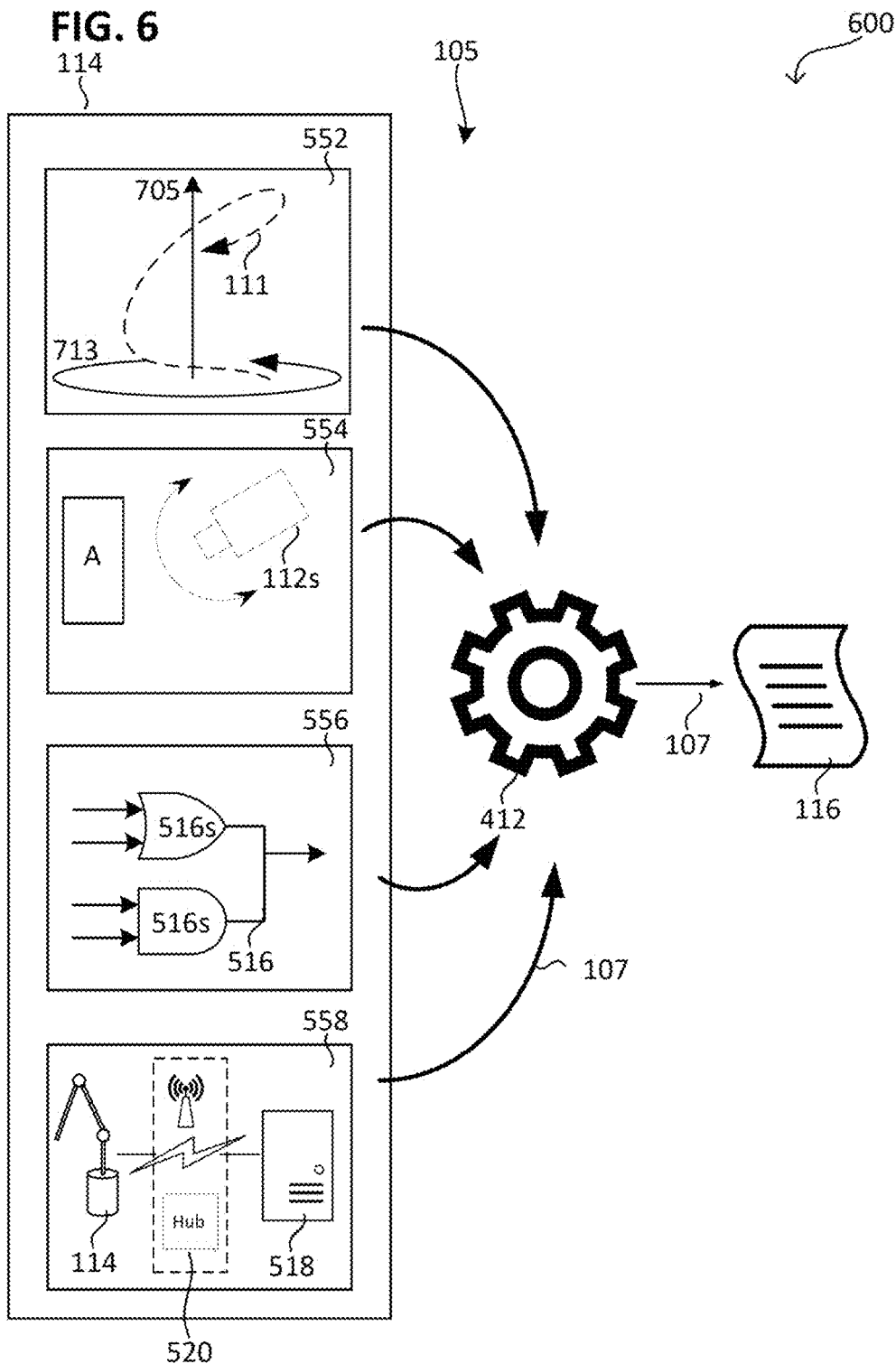
FIG. 6 shows the method according to different embodiments in a schematic flow diagram.

FIG. 6 shows the method 100 according to different embodiments in a schematic flow diagram 600.

The plurality of sub-models of the control model 116m (process-specific and machine-specific model) may be converted into code segments by means of the code generator 412. In other words, a control program 116 may be formed which is executable by the machine 114.

The control program 116 may have source code files which are configured in the respective target format of the machine 114. Each machine 114 (e.g. robot platform) may execute the code of the control program 116 in at least one programming language (e.g. KRL, Rapid, Visual Basic, etc.). The plurality of sub-models of the control model 116m may be converted into text (i.e. onto the code segments) using templates. The templates may be instantiated with process-specific and machine-specific models 114m, 104m and may generate the respective program code.

Figure 7:
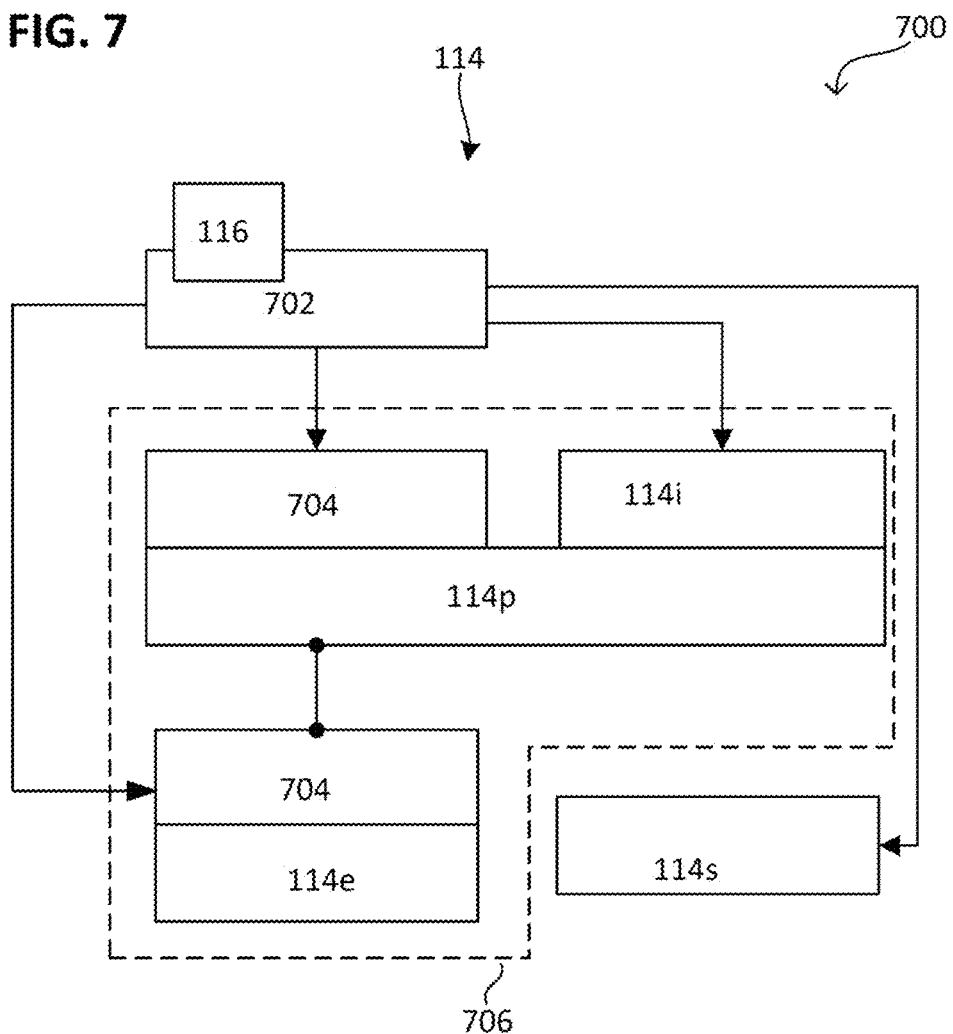
FIG. 7 shows a machine according to different embodiments in a schematic structural diagram.

FIG. 7 shows a machine 114 according to different embodiments in a schematic flow diagram 700.

The machine 114 may herein be a machine programmable by means of a control program 116. Once programmed, the machine 114 may be configured to perform a process flow autonomously and optionally to vary the process flow (i.e. the performance of the task) within limits depending on sensor information.

The machine 114 may have a control device 702 which is configured to control at least one actuator 704 of the machine 114 according to the control program 116. The control device 702 may have, for example, one or more than one processor and/or storage medium. The manipulator 114p, 114e of the machine 114 may have a kinematic chain 706 along which an effect of the at least one actuator 704 is transferred, e.g. along the interconnection of the links of the kinematic chain 706. The control device 702 may have, for example, a programmable logic control (PLC) system.

The kinematic chain 706 may have a positioning device 114p and an end effector 114e positionable by means of the positioning device 114p. The end effector 114c may be understood to mean the final link in the kinematic chain 706 of the machine 114 which is configured to act directly on a workpiece, e.g. to process it. Activities such as the action on the workpiece, a preparatory step therefor or a postprocessing step therefor which correspond to the process flow, may be referred to more generally as a process activity. The process activity may comprise, for example, a casting, jointing (e.g. welding, coating, screwing, inserting, contacting, gluing or other form of mounting or assembling), separating (e.g. grinding, milling, sawing or other form of machining, pressing or disassembling), reshaping, heating, relocating (e.g. gripping, populating, rotating or shifting), or similar. The process flow may be track-based, i.e. may be mapped by means of movement of the end effector 114e along a trajectory 113.

The positioning device 114p may have at least one actuator 704 which is configured to move the end effector 114e to a position (also referred to as positioning). The end effector 114e may have at least one actuator 704 which is configured to perform the process activity, e.g. by means of a tool of the end effector 114e. The tool may generally provide a function according to the process activity by means of which an action may be performed on the work piece. The tool may comprise, for example, a casting tool, a jointing tool (e.g. screwdriver, glue gun or welding device) a displacement tool (e.g. gripper), a separating tool or similar. The jointing tool may comprise or may be formed from, for example, a coating tool (e.g. a paint spray gun, a powder-coating gun).

The machine 114 may optionally comprise at least one internal sensor 114i which is configured to detect an operating point of the kinematic chain, e.g. in order to implement a regulation. Alternatively or additionally, the machine 114 may comprise at least one external sensor 114s (e.g. a camera) which is configured to detect a characteristic of the environment of the machine 114. It is possible to detect, for example, by means of the external sensor 114s whether a predefined process situation prevails (i.e. a situation-related criterion is met).

It is possible to determine, for example, on the basis of the characteristic detected by means of the at least one sensor 114s, 114i whether a criterion is met. If the criterion is parameterized according to the sensor type (i.e. mapped onto a characteristic detectable by the sensor type), the characteristic detected by the sensor may be compared with the parameterized criterion in order to determine whether the criterion is met.

If the process flow is emulated by the programmable machine 114, the machine 114 as a whole may be moved into an operating point which corresponds as closely as possible to the process activity according to the spatial information. The operating point may define, for example, the position to which the end effector 114e is intended to be moved and the effect which it is intended to provide there. The operating point may describe, for example, the sum of states of the individual actuators 704 of the machine 114.

The storage medium may be provided as part of the control device 702 and/or separately therefrom. The storage medium may comprise, for example, an electronic semiconductor storage medium, e.g. a read-only memory (ROM) or a random-access memory (RAM), a memory card, a flash memory, a stick for a universal serial bus (USB stick), a solid-state drive (SSD), and/or a hard disk drive (HDD), a memory disk (MD), a holographic storage medium, an optical storage medium, a compact disc, a digital versatile disk (DVD), or magneto-optical disk.

The control has been described above with reference to a machine. By way of analogy, the description may apply to a plurality of machines which are separate, e.g. communicating with one another (e.g. a process route), and also to a machine which has a plurality of positioning devices and/or end effectors.

Different examples are described below which relate to the details set out in the description above and illustrated in the figures.

Example 1 is method comprising: determining a machine-independent process model on the basis of data, wherein the data represent a handling of a work tool when performing a process flow, wherein the process flow comprises a plurality of sub-processes, wherein the process model links a process activity with spatial information of the sub-process for each sub-process of the plurality of sub-processes; mapping the machine-independent process model onto a machine-specific control model of a machine using a model of the machine, wherein the machine-specific control model defines an operating point of the machine for each sub-process of the plurality of sub-processes, said operating point corresponding to the process activity and to the spatial information of the sub-process.

Example 2 is the method according to example 1, wherein the mapping comprises mapping the spatial information onto an operating point of a positioning device of the machine; and/or wherein the mapping comprises mapping the process activity onto an operating point of an (e.g. movably mounted) end effector (e.g. the tool thereof) of the machine; wherein the end effector is movably mounted, for example, by means of the positioning device, wherein the positioning device comprises, for example, a robot arm, wherein the end effector is configured, for example, to perform the process activity.

Example 3 is the method according to example 1 or 2, wherein the machine comprises at least one actuator to which the operating point is related, wherein, for example, the actuator is a motor, wherein, for example, the actuator is part of the positioning device and/or the end effector.

Example 4 is the method according to one of examples 1 to 3, wherein the spatial information has precisely three location coordinates (e.g. according to a Cartesian coordinate system) and/or precisely three direction coordinates and/or wherein the spatial information is related to a linear coordinate system.

Example 5 is the method according to one of examples 1 to 4, wherein one or more than one sub-process of the plurality of sub-processes is determined according to a criterion (also referred to as a conditional sub-process), wherein the model of the machine represents a sensor type of the machine, wherein the mapping comprises parameterizing the criterion according to the sensor type (e.g. mapping it onto a sensor detection space), wherein, for example, determining the process model comprises determining the criterion and/or the conditional sub-process (e.g. on the basis of the data).

Example 6 is the method according to one of examples 1 to 5, wherein the mapping comprises mapping the spatial information onto a coordinate system of the machine (which is related e.g. to the at least one actuator of the machine).

Example 7 is the method according to one of examples 1 to 6, wherein determining the process model comprises determining (e.g. on the basis of the data) one or more than one process logic (e.g. a rule) according to which the machine-independent process model is run, wherein the process logic is optionally configured to determine whether the criterion is met, wherein, for example, the parameterized criterion is detectable by means of the sensor, wherein, for example, the mapping comprises mapping the process logic onto a control logic.

Example 8 is the method according to one of examples 1 to 7, wherein the machine-independent process model (e.g. its process logic) comprises at least two links of process activity and spatial information of the sub-process for at least one sub-process of the plurality of sub-processes, wherein the two links are alternatives, one of which is chosen on the basis of a criterion (e.g. by means of the process logic).

Example 9 is the method according to one of examples 1 to 8, wherein the spatial information represents a position and/or an orientation of the work tool; and/or wherein the process activity represents an actuation and/or an operating point of the work tool.

Example 10 is a method according to one of examples 1 to 9, further comprising: presenting the machine-independent process model and/or the machine-specific control model by means of a user interface which is configured to modify the machine-independent process model or the machine-specific control model on the basis of a user input.

Example 11 is a method according to one of examples 1 to 10, further comprising: capturing the data at least partially by means of a sensor arrangement which is attached to the work tool, wherein the work tool is optionally handled and/or carried (e.g. directly and/or muscle-powered) by a person (e.g. his hand), wherein, for example, the sensor arrangement is removably (i.e. reversibly) attached to the work tool.

Example 12 is a method comprising: capturing data, e.g. the data according to one of examples 1 to 11, at least partially by means of a sensor arrangement which is removably attached to an (e.g. manually movable) work tool, wherein the data represent a handling of the work tool while a process flow is performed by means of the work tool, wherein the work tool is moved by a person; determining a machine-independent process model on the basis of the data, said process model representing a process flow, further comprising, for example: mapping the machine-independent process model onto a machine-specific control model using a model of a machine.

Example 13 is the method according to example 11 or 12, wherein the sensor arrangement comprises an attachment device by means of which the sensor arrangement is removably attached to the work tool.

Example 14 is the method according to one of examples 11 to 13, wherein the sensor arrangement (e.g. its attachment device) has one or more than one magnet; and/or a clamping device (e.g. having a clip and/or clamping screws); and/or has a hook-and-loop fastener.

Example 15 is the method according to one of examples 11 to 14, wherein the sensor arrangement is supplied with energy separately from the work tool; and/or wherein the sensor arrangement is galvanically isolated from the work tool.

Example 16 is the method according to one of examples 11 to 15, wherein the sensor arrangement has one or more than one trajectory sensor (e.g. location sensor and/or movement sensor) by means of which the data are captured.

Example 17 is the method according to one of examples 11 to 16, wherein the sensor arrangement has an operating point sensor by means of which an operating point of the work tool is detected, wherein, for example, the operating point sensor has a throughput sensor, a temperature sensor and/or a current sensor (e.g. power sensor).

Example 18 is the method according to one of examples 11 to 17, further comprising: wirelessly transmitting the data from the sensor arrangement to a base station, wherein the base station comprises, for example, a computing unit, wherein the machine-independent process model is determined by means of the computing unit.

Example 19 is the method according to one of examples 1 to 18, wherein the data which are captured, e.g. by means of the sensor arrangement, represent a trajectory (e.g. a location-related and/or movement-related characteristic) of the work tool, and/or represent a characteristic according to the operating point of the work tool (for example volume flow, temperature or current intensity).

Example 20 is the method according to example 19, wherein determining the machine-independent process model comprises determining a trajectory of the process flow, e.g. along which the work tool is guided and/or the sub-processes take place, smoothing said trajectory and/or discarding one or more than one point of the trajectory.

Example 21 is the method according to one of examples 1 to 20, wherein determining the machine-independent process model further comprises taking account of at least one boundary condition for the process activity and/or the spatial information, wherein, for example, determining the machine-independent process model further comprises taking account of a model of at least one sub-process of the plurality of sub-processes, said model defining the boundary condition, wherein the boundary condition is, for example, parameterized (i.e. defined in parameters), wherein the boundary condition is defined, for example, for the entire process flow.

Example 22 is the method according to example 21, wherein the at least one boundary condition is related to time information and/or mechanical information, wherein, for example, the at least one boundary condition comprises an operating speed, a hold time, a force, and/or a pressure.

Example 23 is the method according to one of examples 1 to 22, wherein the data are captured in a time-resolved manner.

Example 24 is the method according to one of examples 1 to 23, wherein the model of the machine takes account of a sensor type of the machine, an end effector of the machine, a positioning device of the machine and/or a physical architecture of the end effector and/or of the positioning device, and/or wherein the model of the machine takes account of a functional characteristic of the end effector.

Example 25 is the method according to one of examples 1 to 24, wherein the machine-independent process model further represents a result of the process flow.

Example 26 is the method according to one of examples 1 to 25, further comprising: mapping the machine-specific control model onto a control program which is executable by the machine, e.g. the code segments of said control program are configured according to a programming interface of the machine.

Example 27 is the method according to example 26, wherein the mapping of the machine-specific control model onto the control program comprises using one or more than one template.

Example 28 is the method according to example 27, wherein the template is instantiated by means of the model of the machine, the process model and/or a model of at least one sub-process.

Example 29 is the method according to one of examples 1 to 28, further comprising: capturing the data at least partially by means of an additional sensor arrangement which is disposed in a stationary manner, wherein, for example, the detection of the additional sensor arrangement and the sensor arrangement and/or the corresponding parts of the data are synchronized.

Example 30 is the method according to example 29, wherein the additional sensor arrangement has an optoelectronic sensor, a distance sensor, a sonar sensor and/or a radar sensor; and/or wherein the data which are captured by means of the additional sensor arrangement represent a trajectory (e.g. a location-related and/or movement-related characteristic) of the work tool.

Example 31 is a system comprising: one or more than one processor which is configured to carry out the method according to one of examples 1 to 30, optionally further having a wireless communication device for wireless communication with the sensor arrangement and/or the additional sensor arrangement.

Example 32 is the system according to example 31, further comprising: one or more than one non-volatile memory in which the machine-independent process model, the machine-specific control model and/or the model of the machine are stored; and/or one or more than one sensor arrangement for capturing the data.

Example 33 is a non-volatile memory having code segments, which are configured, when executed by a processor, to carry out the method according to one of examples 1 to 30.

Example 34 is a machine-independent process model, e.g. a process model from the method according to one of examples 1 to 30, wherein the process model links a process activity with spatial information of the sub-process for each sub-process of a plurality of sub-processes, wherein the plurality of sub-processes are part of the process flow which is performed by means of a work tool, wherein, for example, the spatial information has precisely three location coordinates (e.g. according to a Cartesian coordinate system) and/or precisely three direction coordinates, and wherein the spatial information is related to a linear coordinate system.

The invention claimed is:

1. A method, comprising:
  determining a machine-independent process model based on data representing a handling of a work tool for performing a process flow, wherein the process flow comprises a plurality of sub-processes, wherein the process model represents a formal representation of the process sequence and links, for each sub-process of the plurality of sub-processes, a process activity with spatial information of the sub-process, and wherein the spatial information is associated with a temporal indication of the duration of the process activity, wherein the process model further comprises a process logic which implements a flow diagram according to which the process sequence takes place and which has branches, jumps, loops, or combinations thereof; and
  mapping the machine-independent process model to a machine-specific control model of a machine using a model of the machine, wherein the machine-specific control model defines, for each sub-process of the plurality of sub-processes, an operating point of the machine, wherein the operating point corresponds to the process activity and to the spatial information of the sub-process.

2. The method according to claim 1,
  wherein the mapping comprises mapping the spatial information to an operating point of a positioning device of the machine.

3. The method according to claim 2,
  wherein the mapping comprises mapping the process activity to an operating point of an end effector of the machine, wherein the end effector is movably mounted via the positioning device.

4. The method according to claim 1,
  wherein at least one sub-process of the plurality of sub-processes is determined according to a criterion, wherein the mapping comprises parameterizing the criterion according to a sensor type of the machine.

5. The method according to claim 1,
  wherein the spatial information represents a position and/or an orientation of the work tool.

6. The method according to claim 1,
  wherein the process activity represents an actuation and/or an operating point of the work tool.

7. The method according to claim 1, further comprising:
  presenting the machine-independent process model and/or the machine-specific control model on a user interface configured to modify the machine-independent process model or the machine-specific control model based on a user input.

8. The method according to claim 1, further comprising:
  capturing the data using a sensor arrangement attached to the work tool.

9. The method according to claim 8,
  wherein the data
  represent a trajectory of the work tool and/or
  represent a characteristic of an operating point of the work tool.

10. The method according to claim 1, further comprising:
  capturing the data using an additional sensor arrangement attached at a fixed location.

11. The method according to claim 1, further comprising:
  mapping the machine-specific control model to a control program that is executable by the machine.

12. The method according to claim 11,
  wherein the mapping of the machine-specific control model to the control program comprises using a template.

13. The method according to claim 12,
  wherein the template is instantiated by the model of the machine.

14. A system, comprising:
  a processor configured to:
    determine a machine-independent process model based on data representing a handling of a work tool for performing a process flow, wherein the process flow comprises a plurality of sub-processes, wherein the process model represents a formal representation of the process sequence and links, for each sub-process of the plurality of sub-processes, a process activity with spatial information of the sub-process, and wherein the spatial information is associated with a temporal indication of the duration of the process activity, wherein the process model further comprises a process logic which implements a flow diagram according to which the process sequence takes place and which has branches, jumps, loops, or combinations thereof; and
    map the machine-independent process model to a machine-specific control model of a machine using a model of the machine, wherein the machine-specific control model defines, for each sub-process of the plurality of sub-processes, an operating point of the machine, wherein the operating point corresponds to the process activity and to the spatial information of the sub-process.

15. The system of claim 14, further comprising:
  a non-volatile memory configured to store the machine-independent process model, the machine-specific control model, and/or the model of the machine; and
  a sensor arrangement configured to capture the data.

16. The system of claim 15, wherein the sensor arrangement is removably attached to the work tool via an attachment device.

17. The system of claim 16, wherein the attachment device comprises at least one of a magnet, a clamp, and/or a hook-and-loop fastener.

18. The system of claim 15, wherein the sensor arrangement is galvanically isolated from the work tool.

19. The system of claim 14, wherein the processor is configured to determine the machine-independent process model by determining datapoints representing a trajectory of the process flow along which the work tool is guided, smoothing the datapoints, and discarding at least one datapoint of the datapoints.

20. The system of claim 14, wherein the machine-independent process model is further based on at least one boundary condition for the process activity and/or spatial information.

* * * * *